Figure 1:
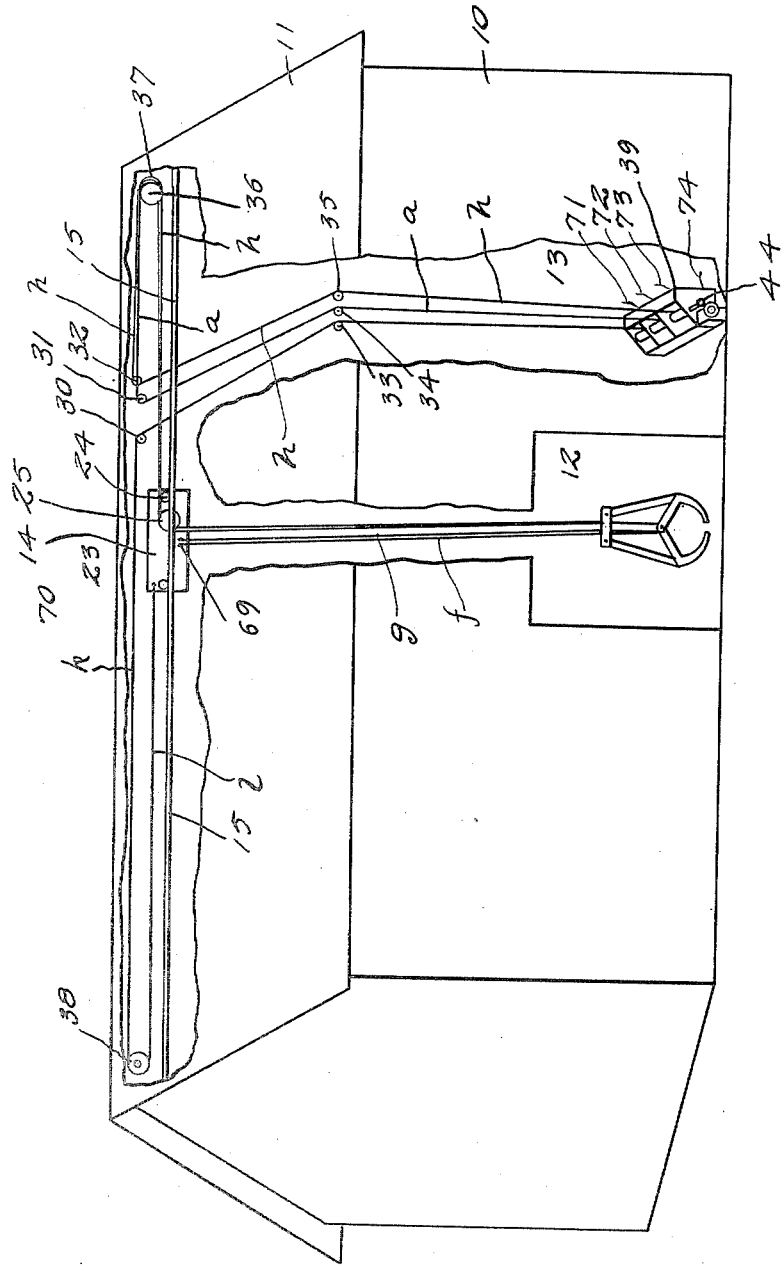

May 30, 1950

J. M. DRISCOLL 2,509,814

HAY AND GRAIN HANDLING DEVICE

Filed Feb. 25, 1946

3 Sheets-Sheet 1

Inventor
J.M. DRISCOLL

By Kimmel & Crowell
Attorneys

May 30, 1950  J. M. DRISCOLL  2,509,814
HAY AND GRAIN HANDLING DEVICE
Filed Feb. 25, 1946  3 Sheets-Sheet 3

Inventor
J.M. DRISCOLL
By Kimmel & Crowell
Attorneys

Patented May 30, 1950

2,509,814

UNITED STATES PATENT OFFICE 2,509,814

HAY AND GRAIN HANDLING DEVICE

Joseph M. Driscoll, Milwaukee, Wis.

Application February 25, 1946, Serial No. 649,795

1 Claim. (Cl. 212—81)

The present invention relates to improvements in hay handling apparatus and more particularly to mechanism arranged overhead in a barn and like hay storing enclosure designed particularly to perform a series of interassociated or independent actions by way of carrying about a hay holding and releasing grab or forks along the length of the building, raising and lowering it selectively, and operating the scoop in its grain holding and grain releasing functions.

One of the objects of this invention is to provide a simple, efficient and inexpensive device of the character described capable of conserving labor and time in handling hay strewn upon the floor of the building to which it is attached or lodged in a wagon or tractor moving about into or in the building.

Another object thereof is to provide, in a device of the character described an overhead carriage capable of travelling any distance along the length of the building housing same, designed to be held stationary at any such point at the will of the manipulator, and operating from overhead a vertically movable hay holding and releasing device for the purpose of carrying hay picked up in the device to various parts of the building.

A further object of this invention is to provide unitary means for selectively controlling as well as timing the order of operation of the functions of hauling the carriage overhead, raising and lowering the hay holding and releasing grab, and, actuating the grab in its separate hay holding and hay releasing functions.

A still further object of this invention is to provide dependable fool-proof mechanism, controlled from a unitary power plant for supporting in suspended position from the roof of a building a longitudinally travelling vertically adjustable hay handling device which is provided with sets of claws that open and close while the device is in motion or at rest.

Another object thereof is to provide grain handling apparatus in a building or the like in which hay is being stored or moved about from place to place in separate loads of such a character that a single operator standing at one point in the building can easily and dependably actuate selectively and synchronously the movements of a hay holding and releasing pick-up device in its raising and lowering functions and hay holding or releasing functions as well as in its movement along the length of the building overhead, and, at the same time, enable him to stop the travelling of the device selectively.

In carrying out the foregoing objects I provide flexible connections which extend not only vertically of the building but horizontally thereof overhead for the purpose of imparting longitudinal motion along the length of the structure to a suspended hay handling device which is adapted to pick up and move about from point to point bundles or bunches of hay with which it is brought into engagement. This arrangement lends itself effectively to unitary control from a single power plant located on the floor of the building, easily accessible to a single operator, who, by aid of collectively or separately actuated winding and unwinding cable drums is able to lower and raise the hay handling device from where he is standing and also selectively time and control its movement along the building and its function to pick up, carry and drop the hay which it handles.

With the above and other objects in view my invention consists in the combination, arrangement and details of construction disclosed in the specification, and then more particularly pointed out in the appended claim.

Figure 2:
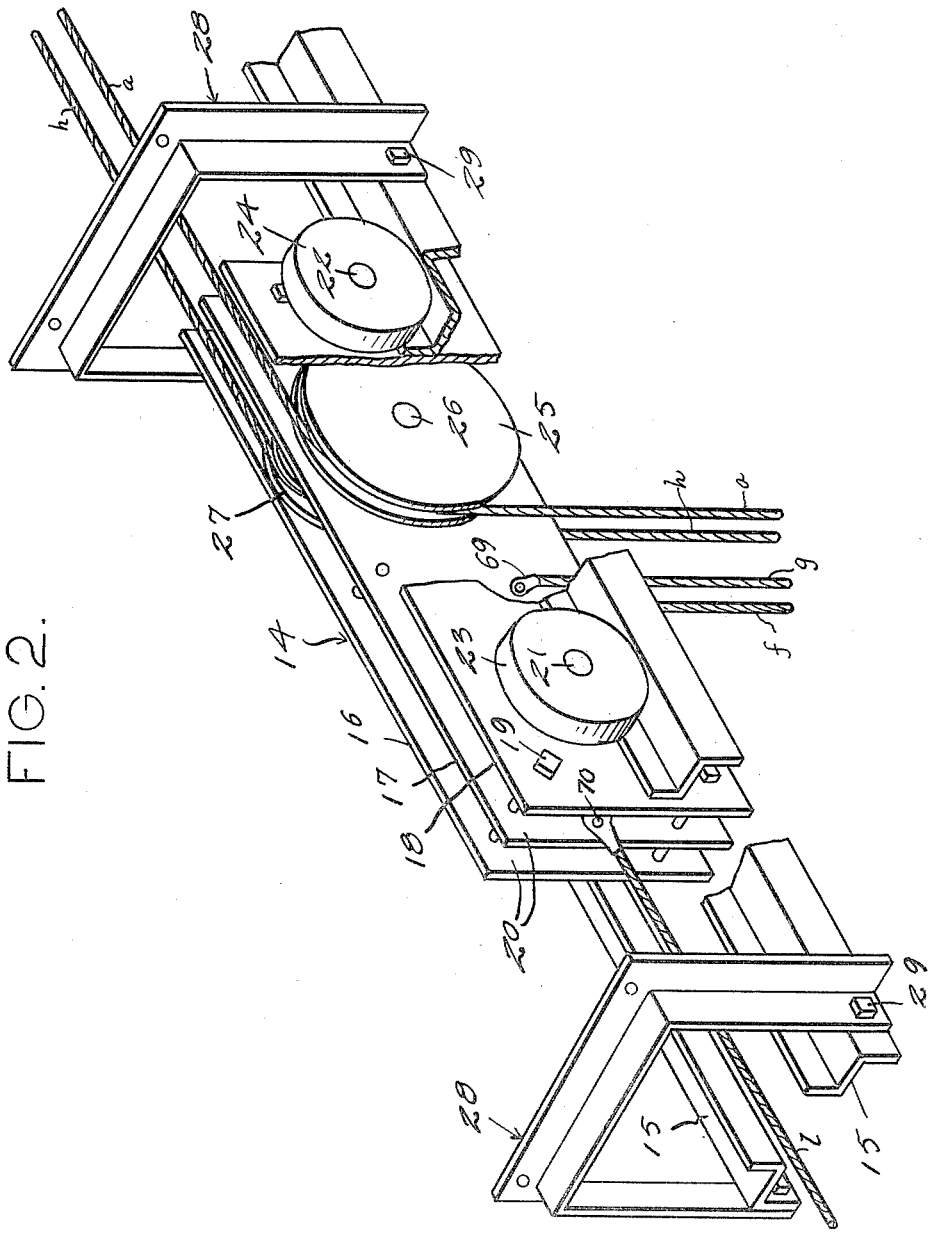
Figure 3:
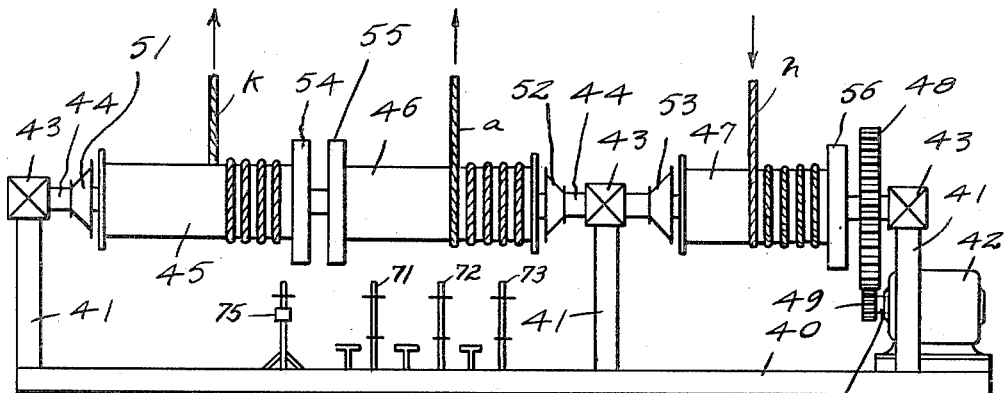
Figure 4:
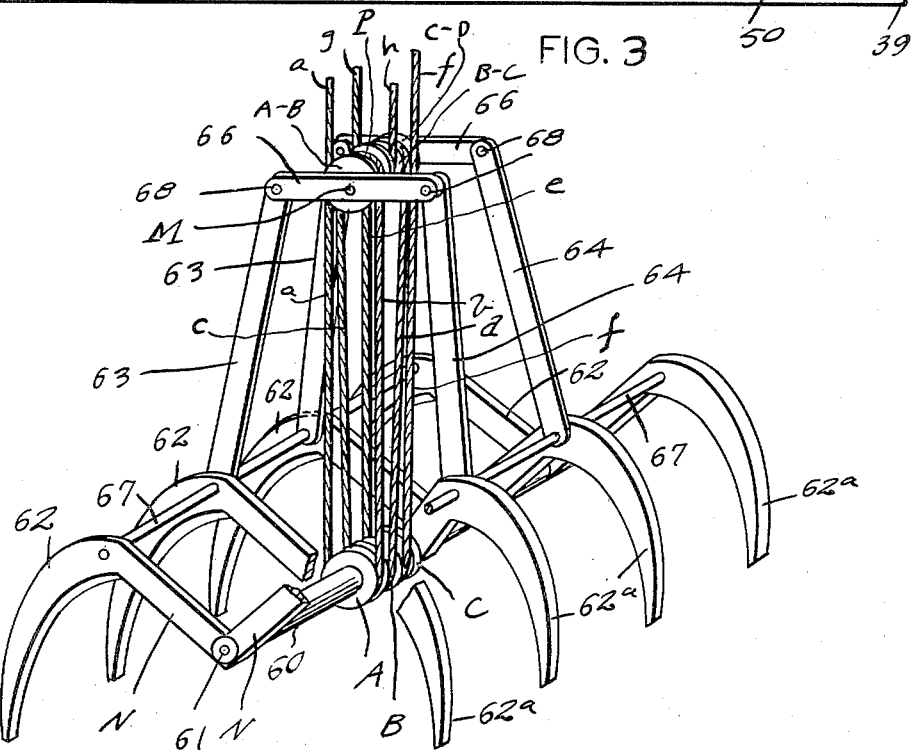

In the drawings wherein similar reference characters designate similar parts throughout the respective views, Figure 1 is a perspective view of a building, shown broken away to disclose operative parts of my invention which are diagrammatically shown, Figure 2 is a fragmental perspective detail view of the travelling carriage, partly broken away and in section, Figure 3 is a side elevation of a power plant, partly in section, and Figure 4 is a perspective view, partly in section of the hay handling holding and releasing device, with its supporting hangers.

In the drawings, which are merely illustrative of my invention I disclose an arrangement including a barn building or the like 10 having a roof 11 and doorway 12 and an interior designated 13. Operatively supported from but below the roof of the building are a pair of longitudinally or horizontally extending tracks 15 with their webs extending as a flange horizontally as shown in Figure 2. A series of vertical plates are provided in a carriage designated broadly 14, said plates being designated 16, 17 and 18 respectively, being secured together in spaced parallel relation by tie bolts 19 or other fastening means, in such a way as to provide intervening channels 20. A pair of oppositely arranged, longitudinally separated traction wheels 23 and 24 are provided for the carriage mounted upon axles 21 and 22 thereof respectively. A shaft 26 is carried by the carriage 14 between the traction wheels 23, 24, upon which are loosely mounted two sheaves 25 and 27 respectively, which are disposed in the channels 20 of the carriage housing. Inverted U-shaped track suspension members 28 are secured to the tracks 15 by fastening members 29 and are adapted to be secured to the interior of the barn for supporting the tracks in horizontal position.

Positioned directly beneath the roof of the building are various idle sheaves for guiding cables about to be described; one of them is designated 30, and a pair of sheaves are respectively designated 31 and 32 being positioned between sheave 30 and the adjacent end of the building, while a pair of sheaves 36 and 37 are positioned at one end of the building, being at the right end thereof, as shown in Figure 1. For the purpose of vertically guiding the mentioned cables, idle sheaves are positioned operatively in a horizontal row being respectively designated 33, 34 and 35. At the remotely opposite end of the building another idle sheave is operatively positioned as at 38 being preferably in the same horizontal level with sheaves 36 and 37.

A suitable power plant is illustrated in Figure 1 and takes the form of a unitary drum casing 39 mounted upon a rigid base member 40, these parts being also shown in Figure 3. A plurality of longitudinally spaced apart standards 41 are supported upon base member 40; a reversible motor 42 is mounted at one end thereof; bearings 43 are mounted at the upper ends of the standards which bearing may be in horizontal alignment. In such bearings a driven shaft 44 extends, upon which is fixed a large spur gear 48 which meshes with an under pinion 49 made fast upon the motor shaft 50. It will be seen that the shaft 44 preferably extends the full length of the base 40, being received in the said bearings 43 rotatingly. Three longitudinally separate cable winding and unwinding drums are loosely mounted, at 45, 46 and 47 upon this shaft 44 in connection with which associatively clutches 51, 52 and 53 are provided which operatively are slid by means (not shown) upon shaft 44 to frictionally make the proper adjacent drums fast upon the shaft 44 so as to rotate therewith. Such mechanism is well known and need not be illustrated herein. Other commonly employed machine elements, used in associated relationship with the drums 45, 46 and 47 are braking means, which, while not illustrated, are known to work frictionally in conjunction with the brake flanges 54, 55 and 56 shown in Figure 3. Referring back to Figure 1 it will be seen that the diagrammatically illustrated clutch operating hand levers 71, 72 and 73 are provided upon the power plant by aid of whose intervening connections to the clutches (not shown) they are intended to operate the clutches selectively; in the same way a foot lever or treadle 74 is illustrated in Figure 1, there being a separate one for each drum (but only one visible in Figure 1) which treadles by connections (not shown) are intended to operate the brakes (not shown) for frictionally engaging the drum flanges 54, 55 and 56 selectively.

I will now describe the flexible connections from the drums to the roof of the building and back to the hay handling device which travels to and fro on the track. First it will be noted that two separate pulley blocks and tackle are provided, shown in Figure 4 in conjunction with the hay holding and releasing scoop. The upper one is composed of a shaft M whose ends are rotatingly received in the center parts of cross beams 66. Mounted upon this shaft M are three sheaves or pulleys A—B, B—C, and C—D respectively. A pair of pendant levers 63, 64 are pivotally suspended from the opposite ends of each cross beam 66. A set of oppositely arranged prongs or claws are provided as a means of holding and releasing hay in bulk or in bunches or bundles with which they come in contact with when certain cables about to be described are operated. Each claw includes an inner part N of which constitutes a lever and whose outer terminal is hook-shaped, as indicated at 62; the claws on one side are designated 62 and those on the other side are designated 62a; the inner ends of the lever arms N of the set of claws are operatively designed to swing loosely relatively to a sleeve 60 mounted upon a trunnion rod 61 which passes through the sleeve 60. The inner portions of the claws are connected together for unitary operation by a shaft 67 and the lower ends of the pendant levers 63 and 64 loosely receive the two shafts. Pulleys or sheaves A, B and C are rotatably mounted on shaft or rod 61 between the central pairs of levers N.

Three sets of operating cables are provided, one a holding cable which holds the grab consisting of upper and lower pulley blocks and tackle; another is a carriage hauling cable; and the third is a closing cable for the hay holding and releasing scoop or device consisting of the claws just described. The holding cable $h$ is wound upon one of the drums 47 (Figure 3); thence it passes upwardly in the barn building or the like 10, over idle sheave 35; thence it continues its upward disposition and passes over and around sheave 32; thence it assumes a horizontal direction extending towards the right end of the building; thence it passes over and around sheave 36, and extends horizontally back to the carriage sheave 25, passes over and around same, and extends downwardly from the carriage where (Figure 4) it is trained over and around the central sheave $p$ mounted on shaft M, and extends upwardly with its other stretch $g$, running back to the carriage where it is fixedly secured at 69 thereto (see Figure 1).

The scoop operating cable $a$, Figure 4, is also wound up upon the other drums 46 (Figure 3), in the same direction as is holding cable $h$, so both cables $h$ and $a$ will wind or unwind at the same time, if desired. The cable $a$, on leaving drum 46 extends upwardly, passes over idle pulley 34, thence passes over and around idle pulley 31, takes a horizontal direction and extends towards the right end of the building, thence passes over and around sheave 36, and takes another horizontal direction back to the carriage sheave 27, concentric with sheave 25; thence cable $a$ extends downwardly from the carriage (Figure 1) and is trained over and around the lower sheave A in the lower pulley block of Figure 4, thence cable $a$ has its stretch $b$ extending vertically so as to be trained over and around the upper sheave A—B of the upper pulley block, Figure 4; thence cable $a$ has its stretch $c$ extending downwardly from upper pulley block so as to be trained over and around another sheave B of the lower pulley block; thence another stretch $d$ of the same cable $a$ extends upwardly so as to be trained over and around sheave B—C of the upper pulley block; thence this same cable $a$ has its stretch $e$ extend downwardly from the upper pulley block so as to be trained over and around the endmost sheave C of the lower pulley block, after which another stretch $f$ of this cable $a$ extends upwardly, Figure 4, so as also to be fixedly secured to the carriage 14, Figure 1. It will be thus seen that the scoop operating cable $a$ which is designed to open and close the claws of the hay holding and releasing device is trained over several sheaves of both the upper and lower blocks, while the holding cable $h$ is roven only over one sheave in the upper pulley block P.

The carriage hauling cable $k$ (Figures 3, 4 and 1) is wound upon the drum 45, in a direction counter to the direction in which cables $h$ and $a$ were wound upon their respective drums, and extends upwardly from the drum 45, over idle pulley 33, extends upwardly over and around idle pulley 30, thence extends to the left end of the building 10, and is there trained over and around the sheave 38; thence this cable $k$ has its stretch $l$ (ell) extend horizontally back to the carriage where it is attached fixedly to the latter as at 70. 75 designates a motor controlling reverse lever.

The function and operation of my invention is as follows: When it is desired to operate the mechanism so as to impell the carriage to and fro upon track 15 the carriage operating cable $k$ is actuated, and in doing so the other cables may also call for operation. First it is necessary to see that all three friction clutches 51, 52 and 53 are engaged operatively, and that all three drums 45, 46 and 47 revolve with the shaft 44, when the motor is in operation so that the holding cable $h$, and the scoop closing cable $a$ are wound up on their drums, and so that the carriage operating cable $k$ will unwind from its drum 45. By reversing the rotation of the shaft 44 the carriage cable will wind up on its drum, while the holding cable and the scoop closing cable, will unwind from their drums. The direction of rotation of shaft 44 is controlled by the hand lever 75, which controls the electric motor 42.

The friction clutches 51, 52 and 53 are operated by the hand levers 71, 72 and 73, the brakes (not shown) being operated by the treadles 74. When all three friction clutches are engaged the grab tackle shown in Figure 4 and the carriage can be moved horizontally in either of opposing directions, on the track 15 by operation of the hand controller lever 75 to cause the motor to revolve in either a clockwise or counter-clockwise direction. When the motor rotates in one of these directions, the holding and closing cables $h$ and $a$ are being wound up on their drums, while the carriage cable drum 45 unwinds its cable $k$, causing the carriage to be pulled in the direction that the holding and closing cables are being pulled. When the motor rotates in the opposite direction, the carriage cable drum winds up its cable $k$ while the holding and closing cables $h$ and $a$ are being unwound from their drums, thus causing the carriage to be pulled in the direction that the carriage cable $k$ is being pulled. To stop the carriage at any point along the length of the building, power is shut off from motor 42 and at the same time the carriage drum brake (not shown) is applied to the flange of drum 45 by stepping on the treadle 71. The holding and releasing scoop for grain may have its claws all open at the same time by pulling the friction hand lever for clutch 52 released from engagement with this drum so that the claw closing drum may rotate freely and unwind the scoop closing cable. The construction of the grab tackle shown in Figure 4 is particularly such that it is constrained to open automatically as soon as the scoop closing cable $a$ is allowed to become slack, and paid out so as to increase the distance between the upper and lower pulley blocks which carry respectively the sheaves A—B, P and B—C on the one hand, and sheaves A, B and C on the other hand.

In order to effect the picking up of a load of hay or straw, it will be necessary to move the carriage directly above the load when the carriage drum treadle is set, so as to hold the carriage stationary; then the operator places his foot on the treadle 74 controlling the scoop holding drum; then releases the carriage drum friction clutch 51 by pulling out upon the friction hand lever 71, which action allows the drum to remain at rest while the drum shaft 44 is free to rotate. With the carriage drum disengaged, the weight of the grab tackle causes the holding and closing cable drums 46 and 47 to unwind, thereby lowering the grain carrying device or scoop. The holding and closing drums may have their friction clutches 53 and 52 engaged so as to cause these drums to revolve at equal speed. When the grab device comes to rest on the object to be picked up, the holding drum friction clutch 53 is released in the act of pulling out the holding friction clutch hand lever 73, leaving only the closing friction clutch engaged with driven shaft 44.

Power may be applied to the motor by moving the hand controller lever 75 in forward position, causing the closing drum to wind up the closing cable $a$, which causes the scoop to have its claws closed; when the claws are thus closed the holding drum is engaged by pushing in on the holding friction hand lever 73. With both holding and closing friction clutches engaged power is again applied to the motor by moving the hand controller to the forward position, which causes both drums to revolve and wind up both cables, causing the scoop to be raised. When the grab scoop is raised high enough, the power is shut off from the motor by moving the hand controlling lever 75 to center position. As soon as power is shut off the carriage friction clutch must be engaged by pushing in the carriage friction hand lever 71. When all three friction clutches are engaged together, the load will remain stationary, and the carriage drum foot brake lever 74 can now be released so that the carriage may now be moved in either direction desired. When the carriage is over the place where the load is to be deposited, the grab scoop has its claws opened by pulling out the closing friction clutch 52 as explained before.

I do not mean to confine myself to the exact details of construction herein disclosed but intend to claim all variations falling within the purview of the appended claim.

What I claim is:

A device of the kind described comprising an overhead track, a carriage having rolling contact with said track, a pair of concentric sheaves rotatably mounted on said carriage, a drum housing, a motor driven shaft journalled in said housing, three drums loosely disposed on said motor driven shaft, clutch means operatively connected to said shaft and to each of said drums for selectively fixing said drums relative to said shaft for rotation with the latter, a single pulley rotatably mounted adjacent one end of said track, a pair of pulleys rotatably mounted adjacent the other end of said track, a first flexible cable having one end wound around one of said drums and trained over said single pulley and having the other end fixed to said carriage, a scoop supporting hanger having a plurality of sheaves journalled therein, a second flexible cable having one end wound around another of said drums in a direction opposite to that of said first cable, said second cable being trained over one of said pair of pulleys, over one of said carriage sheaves, over one of said hanger sheaves, and having the other end thereof fixed to said carriage, a scoop depending from said hanger including a pulley block rotatable thereon and adapted to be opened and closed by vertical movement of said pulley block relative to said hanger, and a third flexible cable wound around the third of said drums in the same direction as said second cable and trained over the other of said pair of pulleys, over the other of said carriage sheaves, reaved about the remainder of said hanger sheaves and said scoop pulley block, and having an end thereof fixed to said carriage whereby independent winding of said first named cable upon said one drum will effect movement of said carriage along said track towards said single pulley, independent winding of said second cable on its associated drum will effect the raising of said hanger and said scoop, and independent winding of said last named cable on said third drum will effect gripping action of said scoop, and whereby simultaneous rotation of said three drums in a direction effecting winding of said second and third cables on their associated drums will effect movement of said carriage along said track towards said pair of pulleys.

JOSEPH M. DRISCOLL.

REFERENCES CITED

The following references are of record in the file of this patent:

UNITED STATES PATENTS

| Number | Name | Date |
| --- | --- | --- |
| 516,864 | Hulett | Mar. 20, 1894 |
| 702,909 | Atherton | June 24, 1902 |
| 729,868 | Hunt | June 2, 1903 |
| 812,617 | Thornton | Feb. 13, 1906 |
| 813,364 | Dolan | Feb. 20, 1906 |
| 1,093,832 | Crosby et al. | Apr. 21, 1914 |
| 1,646,119 | Stevenson | Oct. 18, 1927 |